(12) United States Patent
Chaise et al.

(10) Patent No.: US 8,468,640 B2
(45) Date of Patent: Jun. 25, 2013

(54) WINDSHIELD WIPER WITH VIBRATION ACTUATOR

(75) Inventors: Joshua Chaise, Morganville, NJ (US); Esther Chen, Honolulu, HI (US); Robert Holop, Flemington, NJ (US); Luke Xie, Tenafly, NJ (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/018,772

(22) Filed: Feb. 1, 2011

(65) Prior Publication Data

US 2011/0119855 A1 May 26, 2011

Related U.S. Application Data

(62) Division of application No. 11/958,906, filed on Dec. 18, 2007, now Pat. No. 7,900,312.

(60) Provisional application No. 60/883,534, filed on Jan. 5, 2007.

(51) Int. Cl.
*B60S 1/52* (2006.01)
*B60S 1/28* (2006.01)
*B60S 1/38* (2006.01)
*B60S 1/34* (2006.01)

(52) U.S. Cl.
USPC ............... 15/250.19; 15/250.001; 15/250.04; 15/250.4

(58) Field of Classification Search
USPC ........... 15/250.34, 250.351, 250.352, 250.19, 15/250.001, 250.201, 250.04, 250.4, 250.41, 15/250.44
See application file for complete search history.

(56) References Cited

U.S. PATENT DOCUMENTS

| | | | | |
|---|---|---|---|---|
| 2,784,438 A | * | 3/1957 | Petersen | 15/250.19 |
| 3,854,161 A | * | 12/1974 | Benson | 15/250.04 |
| 4,512,810 A | | 4/1985 | Gahlinger | |
| 4,570,284 A | | 2/1986 | Verton | |

(Continued)

FOREIGN PATENT DOCUMENTS

WO WO80/01155 * 6/1980

OTHER PUBLICATIONS

The Shaker. Wiper Shaker Technology Inc. http://www.wipershaker.com/overview.html, Dec. 3, 2007.

(Continued)

*Primary Examiner* — Gary Graham
(74) *Attorney, Agent, or Firm* — Jeffrey P. Calfa; Mark C. Bach

(57) ABSTRACT

A scrubber assembly (14) for a windshield wiper (10) having a wiper arm (12) includes a scrubber housing (22) attached to the wiper arm. The scrubber housing (22) has an interior volume (66) and at least one opening (58). A rod (68) is at least partially disposed in the interior volume (66) and is displaceable from a first position to a second position. A brush assembly (42) is attached to the rod (68) with at least one flexible connecting member (76) that extends through the at least one opening (58) to the brush assembly. When the rod (68) is in the first position, a first portion of the flexible connecting member (76) protrudes from the opening (58), and when the rod is displaced to the second position, a second portion of the flexible connecting member that is larger than the first portion protrudes from the opening.

7 Claims, 7 Drawing Sheets

U.S. PATENT DOCUMENTS

| | | | |
|---|---|---|---|
| 5,012,977 A | 5/1991 | Karklins et al. | |
| 5,354,965 A | 10/1994 | Lee | |
| 5,487,204 A | 1/1996 | Nelson | |
| 5,509,606 A | 4/1996 | Breithaupt et al. | |
| 5,551,232 A * | 9/1996 | Frigon et al. | 60/494 |
| 5,749,119 A | 5/1998 | Isaac | |
| 6,129,093 A | 10/2000 | Kelly | |
| 6,292,974 B1 * | 9/2001 | Merkel et al. | 15/250.201 |
| 6,721,989 B1 * | 4/2004 | Barlow | 15/250.19 |
| 6,892,418 B2 | 5/2005 | Stouder, II | |
| 7,014,717 B1 | 3/2006 | Lahti | |
| 7,111,355 B1 | 9/2006 | Sorensen | |
| 7,549,189 B1 * | 6/2009 | Mayer | 15/250.19 |
| 7,900,312 B2 * | 3/2011 | Chaise et al. | 15/250.04 |
| 2004/0068821 A1 * | 4/2004 | Genick et al. | 15/250.19 |
| 2006/0000044 A1 * | 1/2006 | de La Pena Razquin | 15/250.04 |
| 2006/0236490 A1 | 10/2006 | Blitz | |
| 2008/0028554 A1 | 2/2008 | Chu | |
| 2008/0276402 A1 | 11/2008 | Chaise | |
| 2008/0295690 A1 | 12/2008 | Ehlers | |
| 2009/0044375 A1 | 2/2009 | Thomas | |

OTHER PUBLICATIONS

Billy Westbrook, Tony Asam. Wiper Blades. Scrublades . . . <http://www.scrublade.com/default.tpl>, Aug. 25, 2011.

* cited by examiner

WINDSHIELD WIPER WITH VIBRATION ACTUATOR

CROSS REFERENCE TO RELATED APPLICATION

The present application claims priority to Provisional Application No. 60/883,534 titled "All-weather Windshield Cleaning System" filed on Jan. 5, 2007, and application Ser. No. 11/958,906 filed on 18 Dec. 2007, now U.S. Pat. No. 7,900,312, both of which are herein incorporated by reference.

FIELD OF THE INVENTION

The present invention generally relates to vehicle windshield wipers. In particular, the present invention relates to improved, debris-removing windshield wipers.

BACKGROUND OF THE INVENTION

Windshield wipers are used on vehicles having windshields that are subject to debris, such as rain, snow, ice, insects, dirt, and the like. Windshield wipers typically include a longitudinal frame and a flexible wiper blade running along the length of the frame. Typically, the frame is held by an arm that moves the wiper across the windshield. The wiper blade contacts the windshield and removes the debris so that the driver has a clear view out the windshield.

Typically, vehicles also include a washing mechanism for providing cleaning fluid to the windshield. When debris is deposited on the windshield, the driver activates the washing mechanism to deliver the cleaning fluid to the windshield, and the wiper blade is activated to move across the windshield. The cleaning fluid is usually provided from a spray nozzle near the hood of the vehicle.

However, some debris is particularly hard to remove from the windshield. When the debris cannot be removed by the conventional windshield wiper, the driver has to stop the vehicle and manually clean the windshield. Further, with some debris, the conventional windshield wiper will smear the debris across the windshield, further impairing the driver's ability to see out the windshield.

SUMMARY OF THE INVENTION

A scrubber assembly for a windshield wiper having a wiper arm includes a scrubber housing attached to the wiper arm. The scrubber housing has an interior volume and at least one opening. A rod is at least partially disposed in the interior volume and is displaceable from a first position to a second position. A brush assembly is attached to the rod with at least one flexible connecting member that extends through the at least one opening to the brush assembly. When the rod is in the first position, a first portion of the flexible connecting member protrudes from the opening, and when the rod is displaced to the second position, a second portion of the flexible connecting member that is larger than the first portion protrudes from the opening

DESCRIPTION OF A PREFERRED EMBODIMENT

Figure 1:
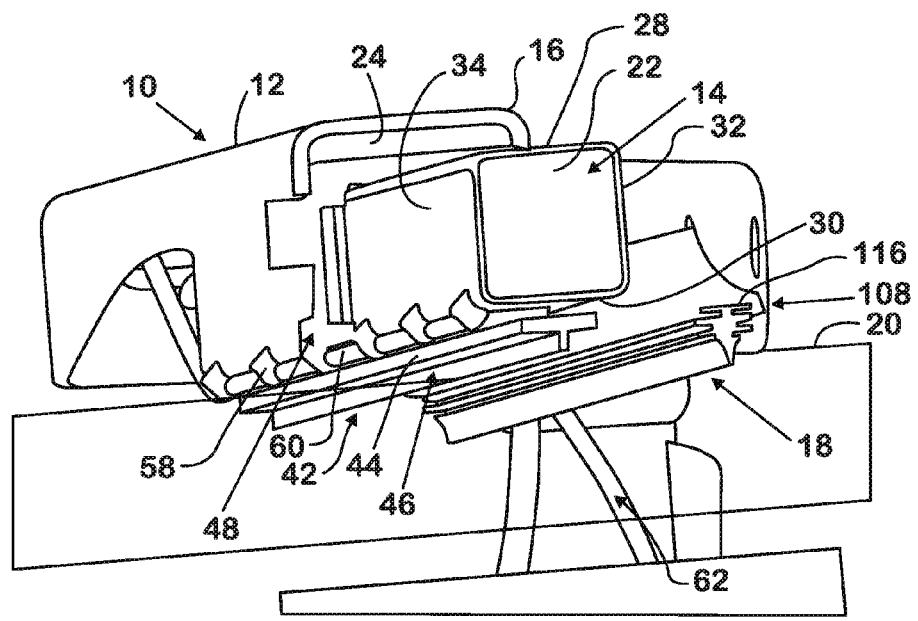
FIG. 1 is a partial section view of a windshield wiper having a scrubber assembly in accordance with the invention.
Figure 2:
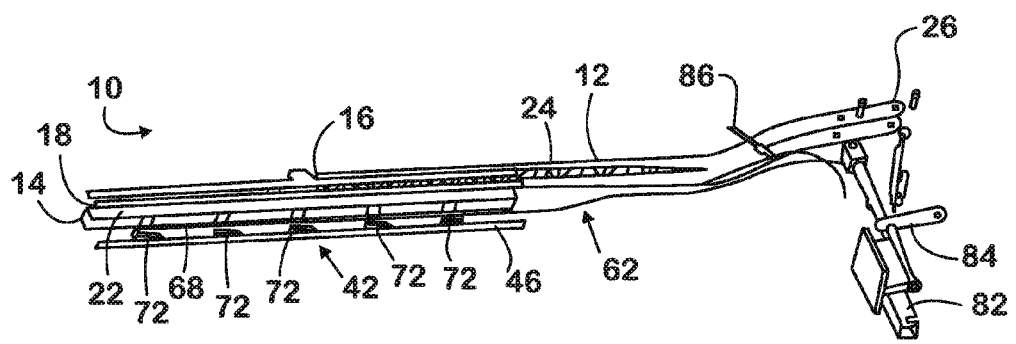
FIG. 2 is an exploded view of the windshield wiper having the scrubber assembly in accordance with the invention.

Referring to FIGS. 1 and 2, a windshield wiper is indicated generally at 10 and includes a wiper arm 12 and a scrubber assembly 14 attached to and extending from a distal end 16 of the wiper arm. A wiper blade 18 is longitudinally disposed with and extends from the wiper arm 12. The wiper blade 18 and the scrubber assembly 14 have substantially equal length and are generally disposed in a parallel arrangement. The wiper arm 12 is configured to sweep the wiper blade 18 across a windshield surface 20 to remove debris from the windshield surface. The wiper blade 18 is flexible, and advantageously, the wiper blade is made of rubber or silicon or the like, although other materials are contemplated.

The scrubber assembly 14 includes a scrubber housing 22 that is attached to the wiper arm 12. Advantageously, the scrubber housing 22 extends within an interior receiving structure 24 towards the pivot end 26 of the wiper arm 12, and also extends beyond the distal end 16 of the wiper arm. In the preferred embodiment, the scrubber housing 22 is generally elongate and cuboid having a top surface 28, a bottom surface 30, a first side surface 32 and a second side surface 34, although other shapes are contemplated.

The interior receiving structure 24 of the wiper arm 12 is configured to receive the scrubber housing 22 and enclose the top surface 28, first side surface 32 and second side surface 34 of the scrubber housing 22. Advantageously, the interior receiving structure 24 is at least partially unenclosed at the bottom, which corresponds with the bottom surface 30 of the scrubber housing 22, to allow the scrubber assembly 14 to protrude downward (towards the windshield surface 20) from the wiper arm 12 to engage the windshield surface.

Figure 4:
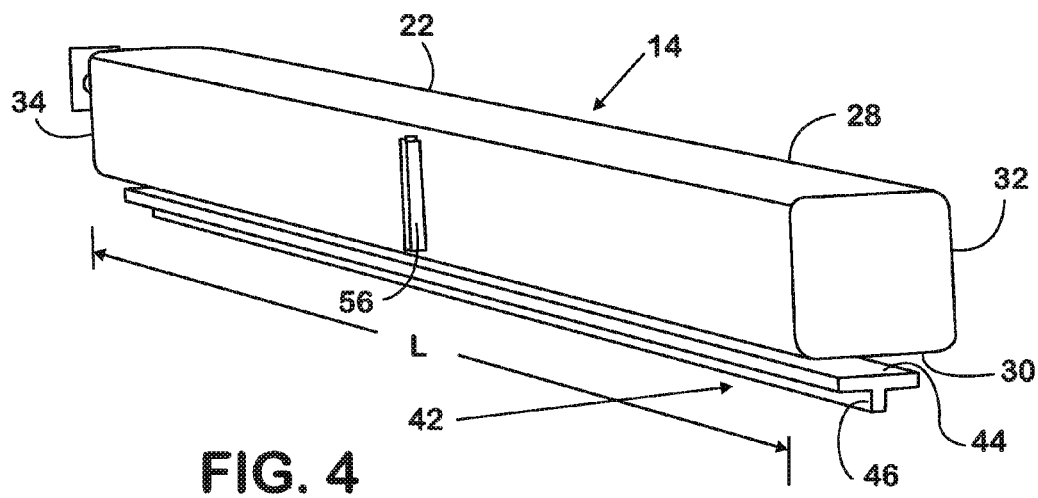
FIG. 4 is a perspective view of the scrubber assembly in accordance with the invention.
Figure 5:
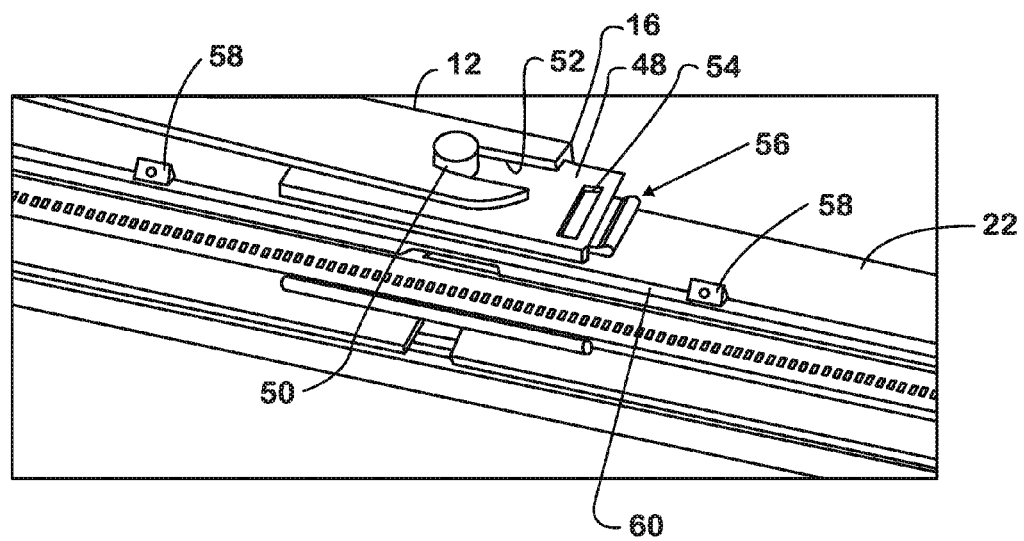
FIG. 5 is a perspective view of a retainer clip for the scrubber assembly in accordance with the invention.

Referring to FIGS. 1 and 4, on the bottom surface 30 of the scrubber housing 22 is a brush assembly, indicated generally at 42, which runs at least substantially the length "L" of the scrubber housing 22. The brush assembly 42 includes a brush attachment arm 44 that is generally parallel with the bottom surface 30 of the scrubber housing 22, and at least one brush member 46 extending downward (towards the windshield surface 20) from the brush attachment arm 44.

Referring to FIGS. 1-2 and 4-5, the scrubber housing 22 is secured to the wiper arm 12 with a retainer clip 48. The retainer clip 48 is attached to the distal end 16 of the wiper arm 12, advantageously receiving the top surface 28, first side surface 32 and second side surface 34 of the scrubber housing 22. Similar to the wiper arm 12, the retainer clip 48 is advantageously open on the bottom surface to allow the scrubber assembly 14 to extend downwardly out of the wiper arm.

The retainer clip 48 has a pivot member 50 that slides into a slot 52 on the distal end 16 of the wiper arm 12. A receiver 54 is located on the retainer clip 48 and is configured for receiving a retaining formation 56 on the scrubber housing 22. In the wiper arm 12, the scrubber housing 22 is slid into the retainer clip 48 until the retaining formation 56 is received in the receiver 54, advantageously in a spring-clip configuration. To remove the scrubber assembly 14, the retaining formation 56 is removed from the receiver 56, advantageously by pressing the spring-clip, and the scrubber housing 22 is slid out of the retainer clip 48.

At least one, and advantageously six nozzles 58 are disposed in a generally spaced arrangement substantially along the length "L" of the scrubber assembly 14, although other numbers and arrangements of nozzles are contemplated. The nozzles 58 are in fluid communication with a washer fluid tube 60 that runs in series between the nozzles. When the scrubber assembly 14 is assembled to the wiper arm 12, a washer fluid hose 62 that is in fluid communication with a washing fluid reservoir 64 (see FIG. 9) is connected to the scrubber assembly to allow the washing fluid to flow from the washing fluid reservoir, through the washer fluid hose, through the washer fluid tube 60 and to the nozzles 58.

Figure 3:
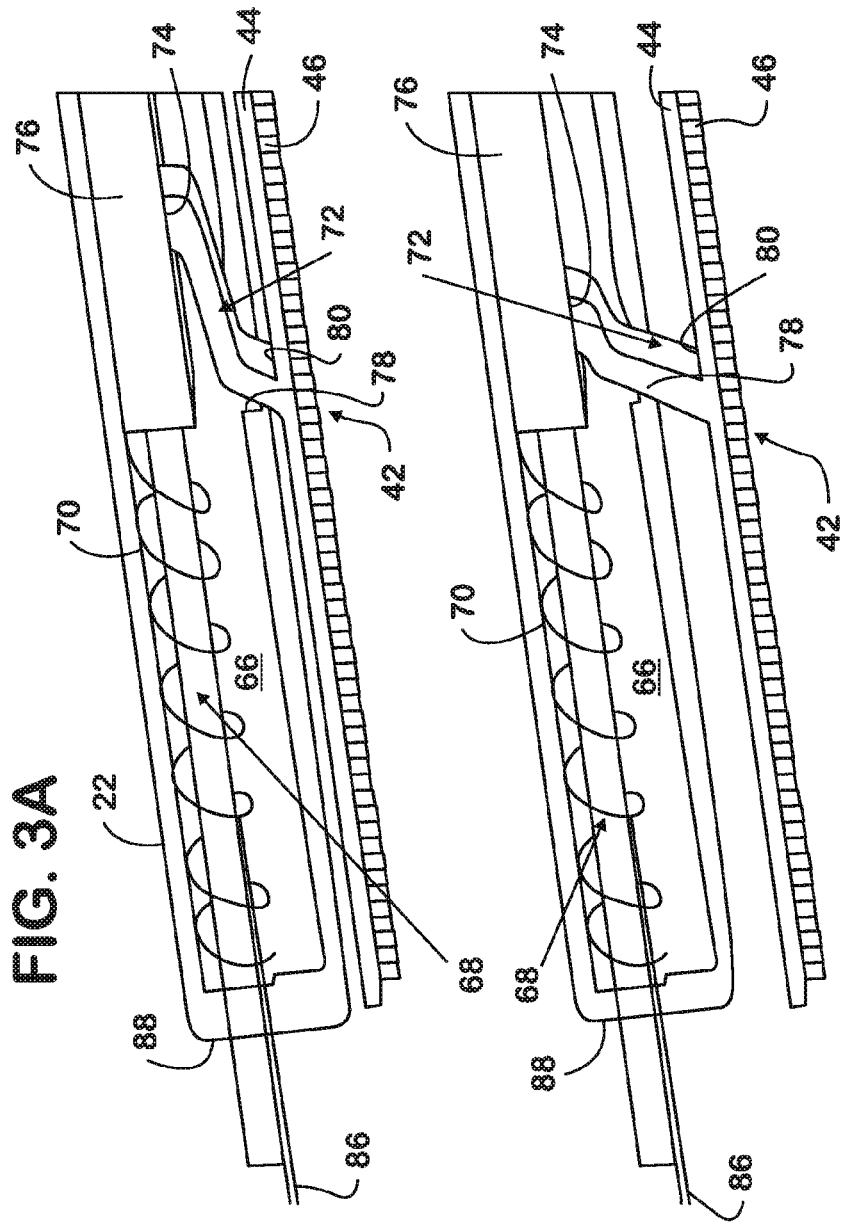
FIG. 3A is a schematic of the scrubber assembly in a first position in accordance with the invention.
FIG. 3B is a schematic of the scrubber assembly in a second position in accordance with the invention.

Referring now to FIGS. 2-3B, the scrubber housing 22 has an interior volume 66 that houses a rod 68 and a spring 70. The rod 68 is connected to the brush assembly 42 with a flexible connecting member 72. A first end 74 of the flexible connecting member 72 is attached to a displacing member 76, which displaces with the rod 68. The spring 70 biases the displacing member 76 and the rod 68 to a first position, as shown in FIG. 3A.

For each flexible connecting member 72, there is a corresponding opening 78 in the bottom surface 30 of the scrubber housing 22. In the embodiment of FIG. 2, there are five openings 78 and five flexible connecting members 72. The flexible connecting members 72 extend from the interior volume 66, where they are connected to the displacing member 76, to outside of the scrubber housing 22, where they are connected to the brush attachment arm 44 with respective second ends 80 of the flexible connecting members 72. In the first position of FIG. 3A, the first end 74 of the flexible connecting member 76 is misaligned with the opening 78, and only a small portion of the flexible connecting member protrudes from the opening.

The scrubber assembly 14 is actuated with a linear actuator 82, advantageously a solenoid. The linear actuator 82 is located on a mounting bracket 84 at the pivot end 26 of the wiper arm 12. A pull cable 86 is connected to the linear actuator 82 and to the rod 68 located in the scrubber housing 22.

When the linear actuator 82 is actuated, the linear actuator pulls on the pull cable 86 against the force of the spring 70, and the displacing member 76 is displaced towards a proximal end 88 of the scrubber housing 22. When the displacing member 76 is displaced to the second position of FIG. 3B, the first end 74 of the flexible connecting members 76 are substantially aligned with the openings 78 such that a larger portion of the flexible connecting members protrude out of the openings. Advantageously, as seen in the second position of FIG. 3B, there is a slight misalignment to allow the flexible connecting member 76 to bend adjacent to and inside the opening 78, and to extend at a non-perpendicular angle to the scrubber housing 22.

As the flexible connecting members 76 protrude out of the openings 78, the brush member 46 is forced down towards the windshield 20. Upon contact with the windshield 20, the flexible connecting members 76 will bend again, outside of the opening 78, creating a linear motion of the brush member 46 along the windshield. This linear motion provides improved scrubbing over the conventional windshield wiper.

When the linear actuator 82 is de-actuated, the tension on the pull cable 86 will be released and the spring 70 will force the rod 68 back to the position of FIG. 3A. As the rod 68 returns to the first position, the flexible connecting members 76 will retract the brush member 46 from the windshield 20. Advantageously, the linear actuator 82 is repeatedly actuated and de-actuated to provide a scrubbing action on the windshield wiper surface 20.

Referring now to FIGS. 6-8B, the windshield wiper 10 includes a vibration actuator 90, advantageously an air cylinder, having an actuating arm 92 attached to the wiper arm 12. The vibration actuator 90 is attached to the pivot end 26 of the wiper arm 12, and also to the mounting bracket 84. In the wiper arm 12 of FIGS. 6-7, the vibration actuator 90 is disposed at an acute angle to the wiper arm 12, however it is contemplated that other angles can be used.

Figure 6:
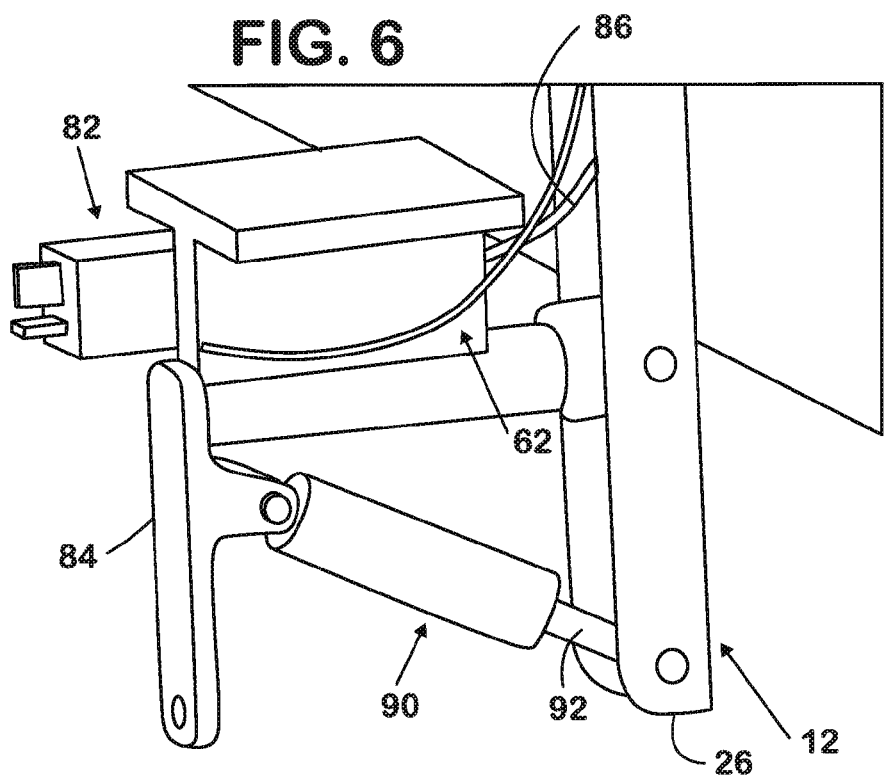
FIG. 6 is a perspective view of a vibration actuator in a normal position in accordance with the invention.
Figure 7:
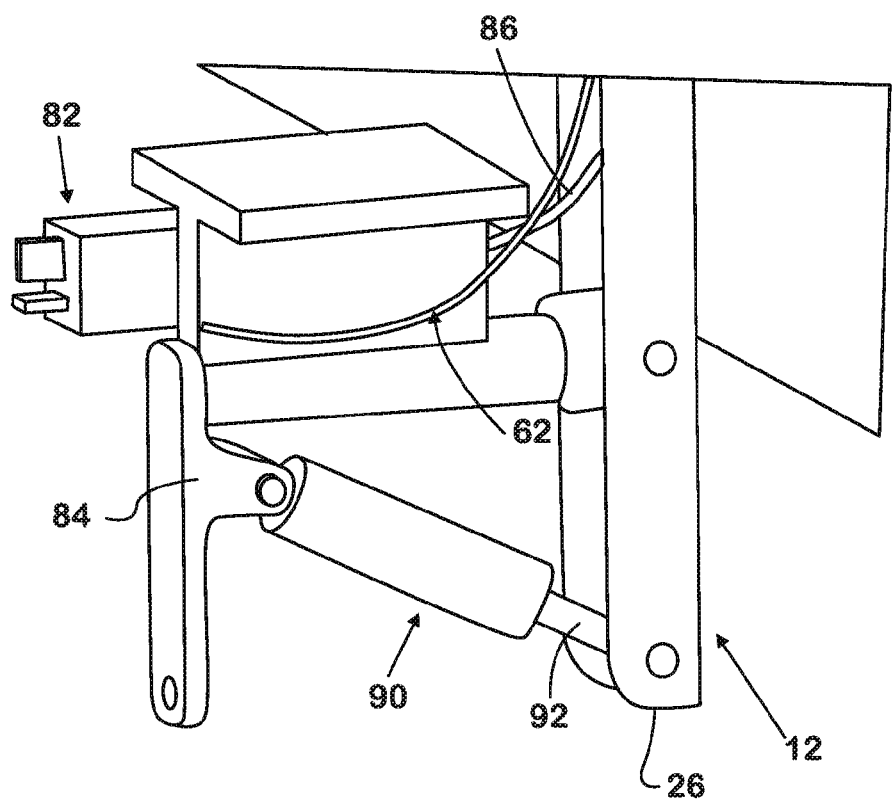
FIG. 7 is a perspective view of the vibration actuator in a vibrational position in accordance with the invention.
Figure 8A:
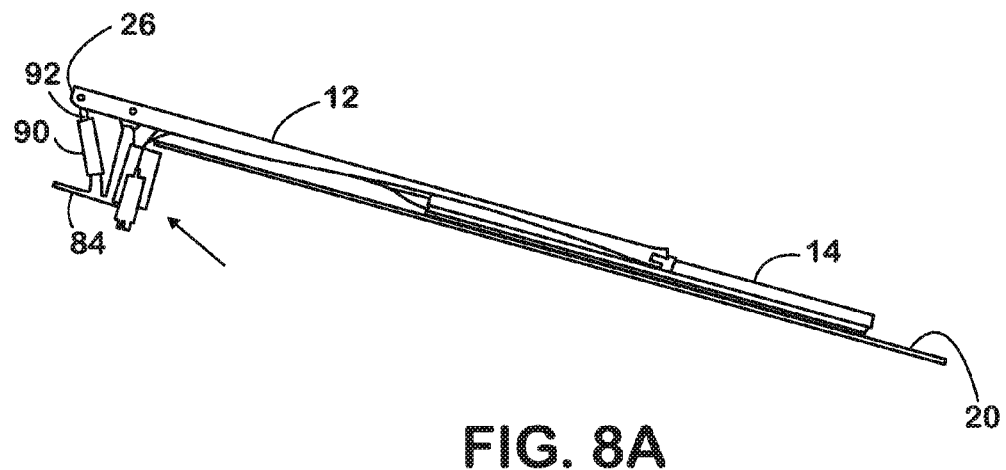
FIG. 8A is a side view of the windshield wiper in a normal position in accordance with the invention.

Advantageously, the vibration actuator 90 is in fluid communication with a fluid source, such as a brake system (not shown), which delivers fluid to the vibration actuator 90. When the vibration actuator 90 is de-actuated, the actuating arm 92 is extended as seen in FIG. 6, and the wiper blade 18 is in contact with the surface of the windshield 20 as seen in FIG. 8A. When the vibration actuator 90 is actuated, the actuating arm 92 will retract as seen in FIG. 7, and the wiper blade is lifted off the surface of the windshield 20 as seen in FIG. 8B.

Figure 8B:
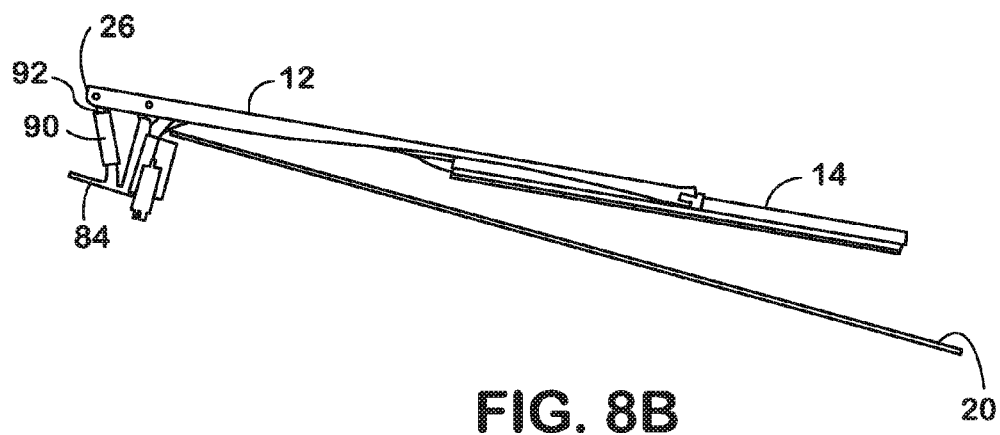
FIG. 8B is a side view of the windshield wiper in a mid-vibration position in accordance with the invention.

A series of pulses of fluid to the vibration actuator 90 causes the wiper arm 12 to vibrate between the positions seen in FIGS. 8A and 8B. It is contemplated that a three-way solenoid valve could be used to deliver fluid to the vibration actuator 90, among other valves. Further it is contemplated that the vibration actuator 90 can only be actuated when there is a minimum amount of pressure in the brake system.

Lifting of the wiper arm 12 off of the windshield surface 20 allows trapped debris to be freed, and also breaks ice, snow and other debris off of the wiper arm 12 and the windshield surface. It is contemplated that the vibration actuator 90 can be actuated in tandem with the scrubber assembly 14, or alternatively, can only be actuated when the scrubber assembly is not actuated, so as to avoid damaging the scrubber assembly in the downward protruding position of FIG. 3B.

Figure 9:
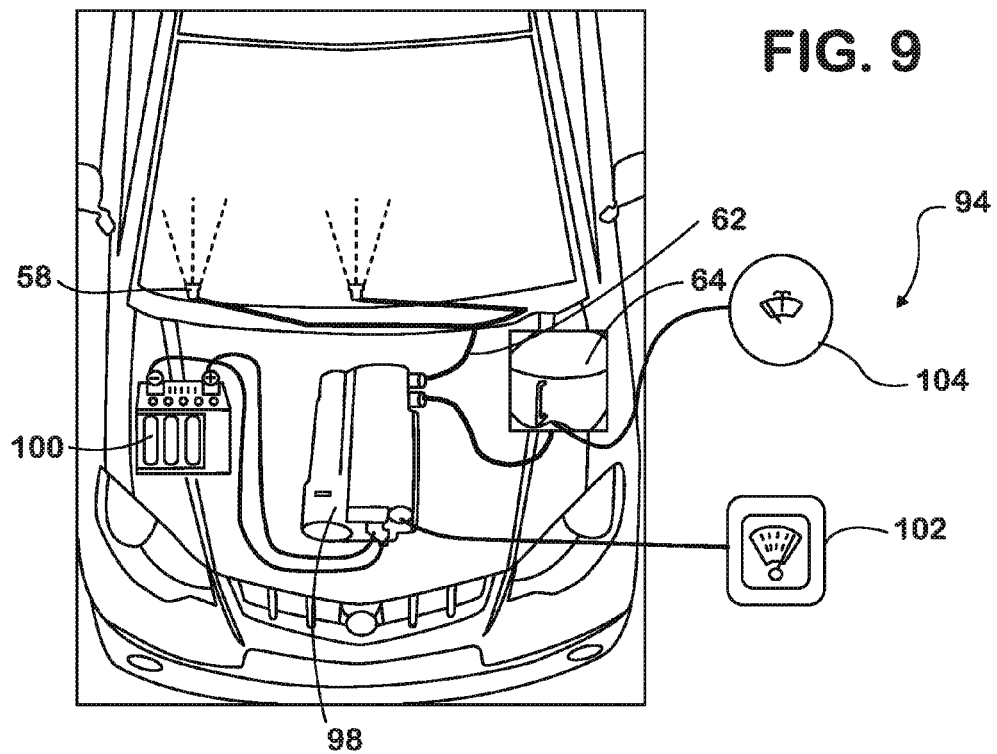
FIG. 9 is a washing fluid delivery system for delivering washing fluid to a windshield in accordance with the invention.
Figure 10:
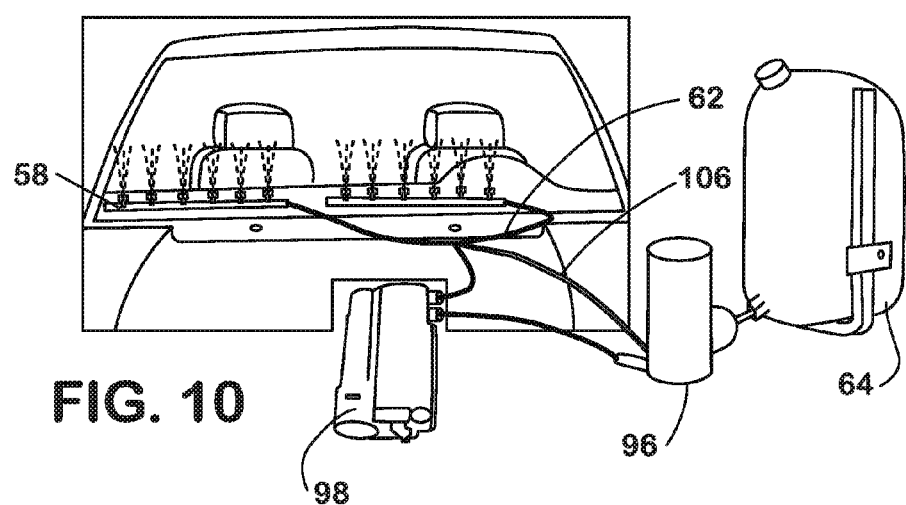
FIG. 10 is the washing fluid delivery system for delivering washing fluid to a second embodiment of windshield wiper in accordance with the invention.

Turning to FIGS. 9 and 10, a washing fluid delivery system is indicated generally at 94 and includes the washing fluid reservoir 64. Fluid from the washing fluid reservoir 64 is pumped with a washer pump 96 to a heater 98 where it is heated and released. The heater 98 draws current and voltage from the vehicle battery 100. A "heated fluid" control switch 102 and a "fluid pump" control switch 104 are located in the vehicle dash.

When both the "fluid pump" control switch 104 and the "heated fluid" control switch 102 are actuated by the user, the washing fluid is pumped from the washing fluid reservoir 64 to the heater 98, which is powered by the battery 100. The heated washing fluid flows through the washing fluid hose 62, which is run up the wiper arm 12 (see FIG. 2), through the washer fluid tube 60 that runs in series between the nozzles 58 on the scrubber assembly 14, where the heated water flows out the nozzles. In FIG. 9, one nozzle 58 is disposed on each wiper arm 12. In FIG. 10, six nozzles 58 are disposed on each wiper arm 12, although other numbers are contemplated. If only the "fluid pump" control switch 104 is actuated by the user, the washing fluid bypasses the heater 98 with a bypass 106 and flows directly to the nozzles 58.

Figure 11:
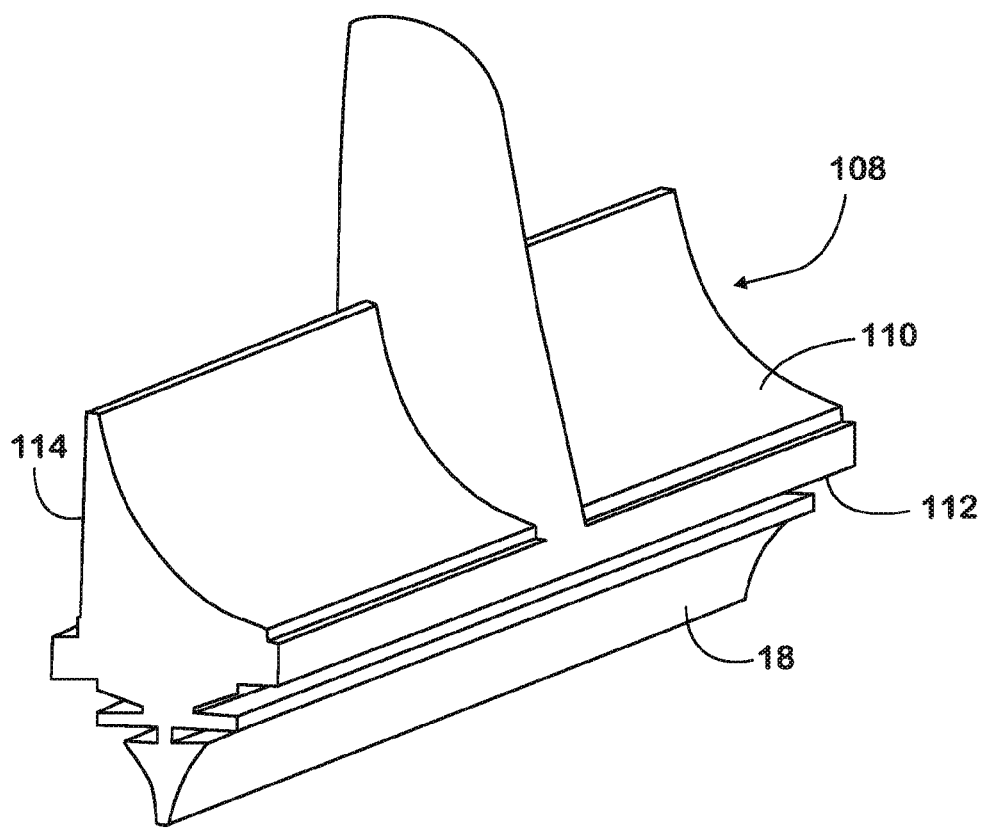
FIG. 11 is a perspective view of a spoiler for the windshield wiper in accordance with the invention.

Referring now to FIGS. 1 and 11, a spoiler is indicated generally at 108 and is generally wedge-shaped, including a contoured surface 110, a bottom surface 112 and an abutting surface 114. The spoiler 108 runs at least substantially the length of the scrubber assembly 14. The bottom surface 112 of the spoiler 108 receives the wiper blade 18 at a slot 116. The abutting surface 114 is configured to abut the first side surface 32 of the scrubber housing 22.

Opposite the abutting surface 114 is the contoured surface 110, which has a geometry that is configured to increase the downward pressure of the wiper on the windshield 20. In a conventional windshield wiper 10, the pressure builds up on the front of the wiper (in direction of motion), and the pressure behind the wiper is significantly lower.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A windshield wiper having a wiper blade for wiping a surface of a windshield of a vehicle having a brake system, the windshield wiper comprising:
 a wiper arm having a pivot end, wherein the wiper blade is longitudinally disposed with and extends from the wiper arm adjacent to the pivot end of the wiper arm;
 a generally L-shaped mounting bracket attached to the wiper arm, wherein the mounting bracket has a first leg that is attached to the wiper arm, and a second leg that extends generally perpendicularly from the first leg;
 a vibration actuator having an actuating arm attached to at least one of the wiper arm and the mounting bracket, wherein the vibration actuator has a first end that is attached to and extends from the second leg of the mounting bracket, and the vibration actuator has a second end that is attached to and extends to the wiper arm adjacent the pivot end of the wiper arm, wherein the vibration actuator is non-parallel with the wiper arm;
 a fluid source configured for fluid communication with the vibration actuator, wherein when the vibration actuator is de-actuated, the actuating arm is extended and the wiper blade contacts the surface of the windshield, and wherein when the vibration actuator is actuated, the actuating arm retracts and the wiper blade is lifted off the surface of the windshield;
 a scrubber housing attached to the wiper arm and having an interior volume, the scrubber housing having at least one opening;
 flexible connecting members partially disposed in the interior volume of the scrubber housing and extending through the at least one opening; and
 a brush assembly attached to the flexible connecting members, wherein the brush assembly is displaceable as the flexible connecting members are displaceable outwardly and inwardly with respect to the interior volume of the scrubber housing.

2. The windshield wiper of claim 1 wherein a generally wedge-shaped spoiler extends substantially the length of the scrubber housing.

3. The windshield wiper of claim 1 wherein the scrubber housing is secured to the wiper arm with a retainer clip attached to a distal end of the wiper arm.

4. The windshield wiper of claim 3 wherein the retainer clip further comprises a pivot member that slides into a slot on the distal end of the wiper arm, and a receiver configured for receiving a retaining formation on the scrubber housing.

5. The windshield wiper of claim 4 wherein the scrubber housing is slid into the retainer clip until the retaining formation is received in the receiver.

6. The windshield wiper of claim 1 further comprising at least one nozzle in fluid communication with a washing fluid reservoir.

7. The windshield wiper of claim 6 further comprising a plurality of nozzles that are disposed along a length of the scrubber assembly and are in fluid communication with a washer fluid tube that runs in series between the plurality of nozzles, wherein the scrubber assembly is in fluid communication with a fluid hose that is in fluid communication with the washing fluid reservoir.

\* \* \* \* \*